United States Patent [19]

Cummings

[11] Patent Number: 4,632,465
[45] Date of Patent: Dec. 30, 1986

[54] HUB CAP MOUNTING FOR DRIVE WHEELS OF HEAVY ROAD VEHICLES AND METHOD OF INSTALLATION

[76] Inventor: Veigh X. Cummings, 5040 Three Fountain's Cir., Salt Lake City, Utah 84107

[21] Appl. No.: 773,026

[22] Filed: Sep. 6, 1985

Related U.S. Application Data

[63] Continuation-in-part of Ser. No. 652,118, Sep. 20, 1984, abandoned.

[51] Int. Cl.$^4$ .............................................. B60B 27/06
[52] U.S. Cl. .................................. 301/108 S; 411/908
[58] Field of Search .................... 301/36, 36 R, 37 S, 301/37 SC, 108 A, 108 S, 108 R; 411/378, 427, 908

[56] References Cited

U.S. PATENT DOCUMENTS 2,635,012  4/1953  Rappaport .......................... 301/36 R
3,356,421  12/1967  Trevarrow, Jr. ................... 301/37 S Primary Examiner—David A. Scherbel
Assistant Examiner—Carol L. Olson
Attorney, Agent, or Firm—Philip A. Mallinckrodt

[57] ABSTRACT

An ordinarily uncovered recess of a deeply recessed drive axle wheel of a heavy road vehicle is covered by a hub cap secured in place by nuts applied to externally threaded ends of respective extenders which pass through accommodating holes in the hub cap. The extenders are secured in place by having their opposite ends internally threaded and screwed onto the free ends of the usual lug bolts that extend beyond the usual lug nuts adjacent to the bottom of the recess. In this way, auxiliary valve stems can be mounted in receiving openings in the hub cap, so as to face externally of the wheel for convenient testing of tire air pressure and convenient filling with air when required, and uniformity of undercarriage appearance for the vehicle is achieved. The invention includes the method of mounting and a kit of parts required for carrying out the method. It is preferred that the hub cap securement nuts applied to the extenders be respective pairs of interlocking nuts made of a nylon type of plastic.

13 Claims, 6 Drawing Figures

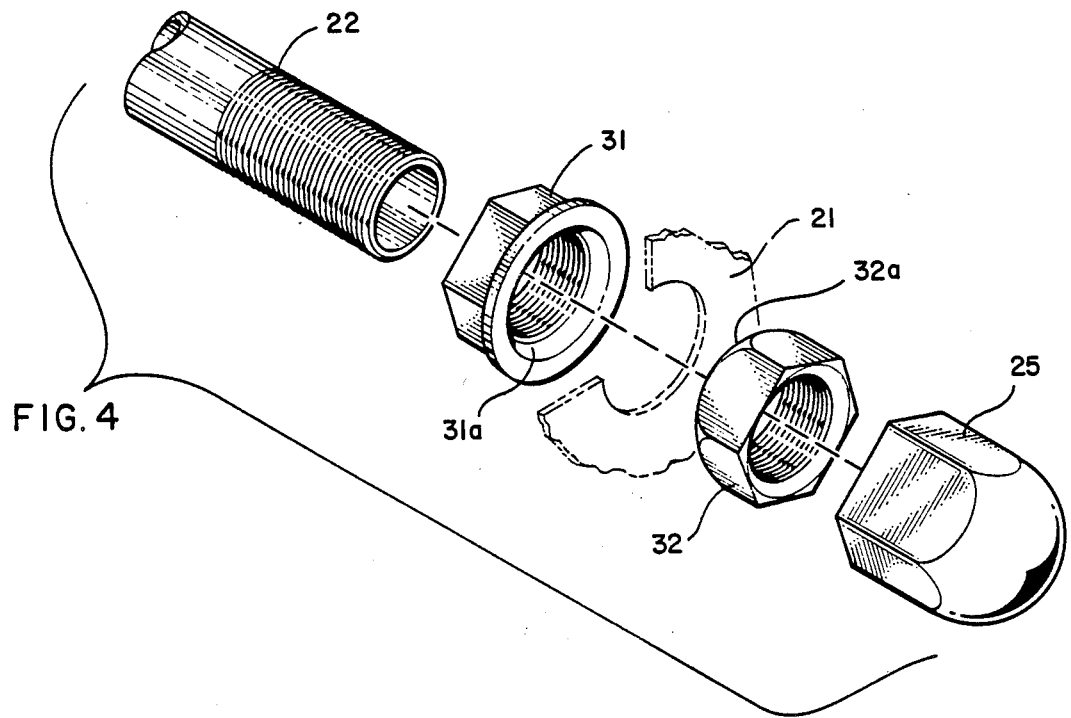
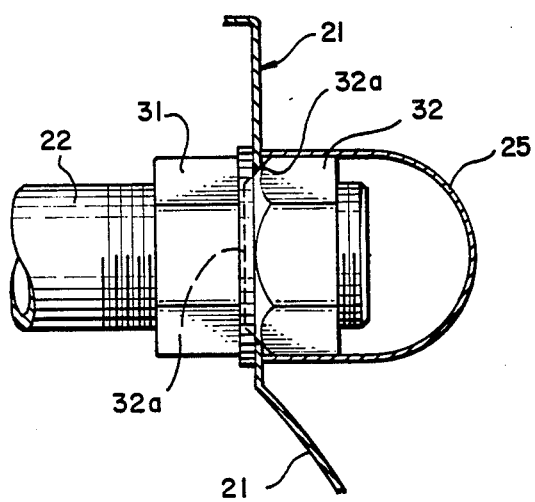 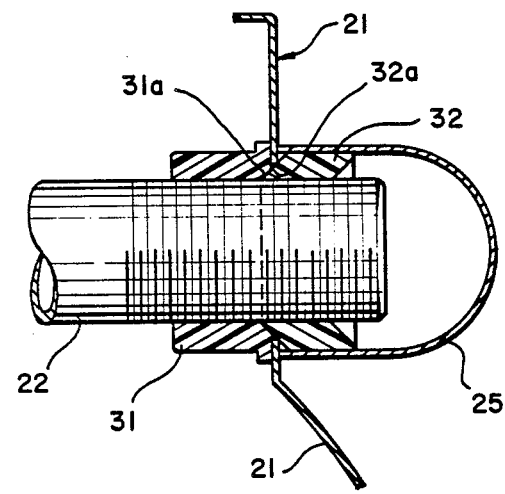
FIG. 5     FIG. 6

HUB CAP MOUNTING FOR DRIVE WHEELS OF HEAVY ROAD VEHICLES AND METHOD OF INSTALLATION

PRIOR APPLICATION

The present application is a continuation-in-part of similarly entitled, copending application Ser. No. 652,118, filed Sep. 20, 1984, now abandoned.

BACKGROUND OF THE INVENTION

1. Field:

This invention is concerned with the installation of hub caps on deeply recessed, drive axle wheels of heavy road vehicles, such as buses and various types of highway trucks.

2. State of the Art:

Heavy road vehicles, such as buses and various types of highway trucks, and particularly those with dual wheels, have been customarily provided with hub caps on all outside wheels except those carried by the drive axle or axles. Because the outside wheels attached to a drive axle are deeply recessed, so that the lug nuts which normally hold a hub cap in place are located at the bottom of the recess remote from the plane of the wheel rim against which a hub cap would normally fit, such wheels are customarily left without hub caps. Some way of simply and relatively inexpensively mounting hub caps on such drive wheels has long been desired.

Additionally, testing air pressure by the usual tire gauges and adding air from the usual air hoses when pressure is low in the tires of such deeply recessed wheels have been difficult, although, recently, flexible tubing has been used in some instances to connect the usual valve stems of the tires with auxiliary valve stems bolted to the drive axle hubs for more convenient access.

SUMMARY OF THE INVENTION

In accordance with the invention, extenders for holding a hub cap or wheel cover are threaded onto the externally threaded, free ends of the lug bolts which extend beyond the conventional lug nuts holding a drive wheel to the drive axle. Each such extender is a length of any suitable material, such as aluminum or steel, having one end recessed and carrying internal threads for screwing onto such free end of a usual lug bolt, and having the other end externally threaded for receiving a hub-cap-securing nut onto which a standard, small, decorative lug nut fitting can be snapped.

It is preferred to use a length of pipe for the extender that has an internal diameter substantially equal to the root diameter of the lug bolt threads and an external diameter substantially equal to the root diameter of the lug nut threads, one end of which is internally threaded for screw engagement with the free end of a lug bolt and the other end of which is externally threaded for screw engagement by a hub cap securement nut.

The lug bolt extenders provide for rigid and tight attachment, by such hub cap securement nuts, of a normal hub cap adjacent to a plane passing through the circumference of the outer face of the rim of the deeply recessed wheel, and, thus, for desired unified appearance of the running gear of a heavy road vehicle such as a bus or the like.

A significant further advantage is achieved by this assembly in that auxiliary valve stems may be more conveniently installed in the hub cap than on the drive axle hub.

A presently preferred and highly advantageous feature of the invention is the provision of special, paired, locking nuts of a nylon type of plastic material characterized by its ability to seize tightly confronting material against which it is pressed. One of the nuts, usually the one on the inside, has an annular taper leading into its threaded interior as the female member of a hub cap clamping arrangement provided by the pair of locking nuts. The other nut, on the outside, has a correspondingly tapered male member for fitting into and against the female member when tightened on the extension of the lug bolt to clamp the hub cap tightly in place. When the hub cap is so locked in place, it has been found that these securement nuts overcome a persistent problem associated with the use of other types of securement nuts, i.e. the problem of gradually loosening by reason of vibration resulting from travel over even the smoothest of paved roads.

THE DRAWINGS

In the accompanying drawings, which illustrate embodiments of the invention presently contemplated as the best mode of carrying it out in practice:

FIG. 1, represents a fragmentary, full face, elevational view of one side of the rear end of the tractor portion of a tractor-trailer highway transport truck having dual rear drive axles with dual wheels on each, the outer wheel of one pair of dual wheels having a hub cap installed in accordance with the invention and, for comparative purposes, the outer wheel of the other pair of dual wheels being shown without a hub cap, as was usual prior to the invention;

FIG. 2, a fragmentary vertical section taken on line 2—2 of FIG. 1, drawn to a considerably larger scale and showing only the outside wheel;

FIG. 3, a perspective view of the preferred form of extender used in the set of dual drive axle wheels to which the invention has been applied as in FIG. 2;

FIG. 4, an exploded pictorial view of the presently preferred paired locking nuts for tightly securing the hub cap in place against the tendency of road vibration to loosen it;

FIG. 5, a fragmentary section taken longitudinally of the lug bolt extension through the locking nuts of FIG. 4 as applied in use; and FIG. 6, an axial section taken through the locking nuts portion of FIG. 5.

DETAILED DESCRIPTION OF THE ILLUSTRATED EMBODIMENTS

Figure 1:
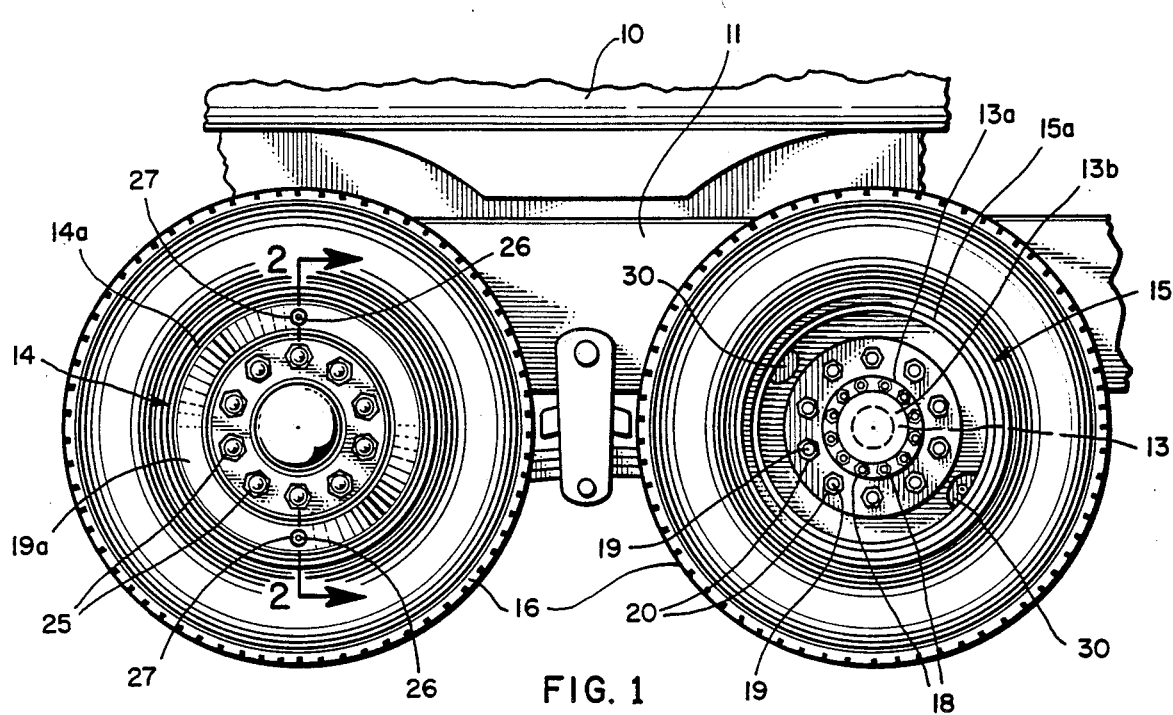

The tractor unit 10 and its undercarriage 11 of a typical tractor-trailer highway transport truck are supported in conventional manner by dual, drive axles 12 and 13, respectively, each equipped with the usual dual sets of deeply recessed, dual, drive wheels 14 and 15, respectively, having customary rims 14a and 15a, respectively, on which are mounted the usual tires 16. Such drive axles 12 and 13 are secured in the usual manner to respective axle wheel hubs, see 12a, FIG. 2, by the usual circular series of bolts 17, FIG. 2, and 18, FIG. 1, passing through axle hub flanges, see 12b, FIG. 2.

The outer wheels 14 and 15 of the respective dual sets of such wheels are secured to the corresponding inner wheels of such sets and to the respective axle wheel hubs by usual lug bolts 19, and lug nuts 20. Lug bolts 19 pass through the flanges, see 12c, FIG. 2, of the respective axle wheel hubs.

As previously indicated, it is usual to leave the wheels of the respective dual sets of dual drive wheels without hub caps, see drive wheel 15, FIG. 1, because of the deeply recessed nature of such wheels and the difficulty if not impossibility of securely attaching a hub cap in place. This is not visually desirable considering the fact that non-drive wheels of both the tractor and trailer unit of the tractor-trailer rig are not deeply recessed and are normally fitted with hub caps. A similar situation exists for many buses, mobile homes, and like types of heavy road vehicles.

Figure 2:
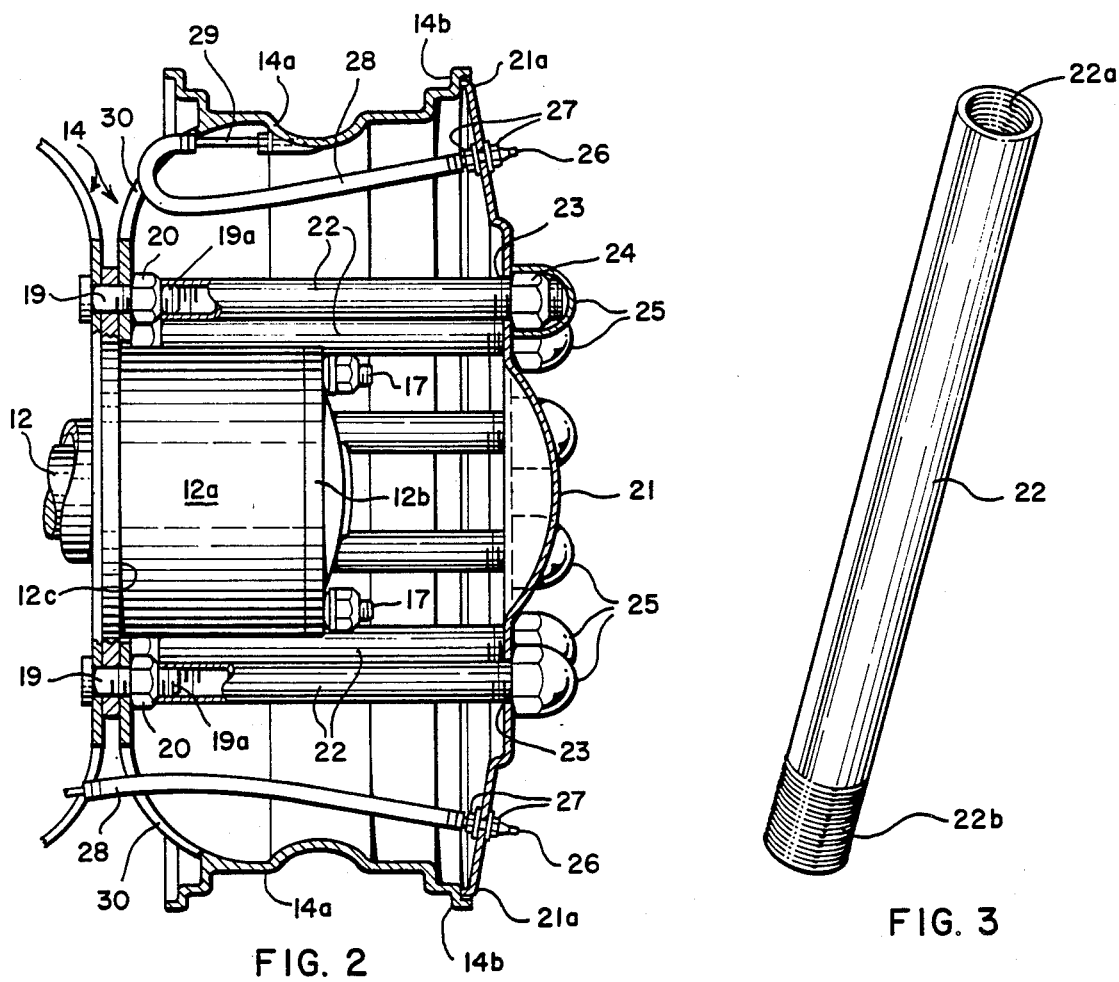

In accordance with the invention, as seen in FIGS. 1 and 2 in connection with drive wheel 14 and relative to drive axle 12, axle wheel hub 12a, and axle hub flange 12b, a hub cap, i.e. wheel cover, 21 of disc formation is effectively secured in place with its periphery 21a firmly seated against the outer peripheral margin, here step formation 14b, of wheel rim 14a. Secure anchoring of such hub cap 21 is effected by means of lug bolt extenders 22 screwed, respectively, onto the externally threaded, free ends 19a of lug bolts 19.

Hub cap 21 is fitted into place after installation of the lug bolt extenders 22, a corresponding circular series of extender-accommodating openings 23 being provided in the hub cap for the purpose.

Figure 3:
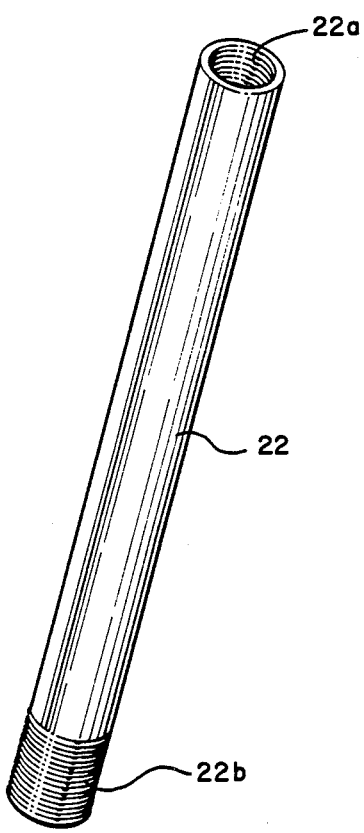

Lug bolt extenders 22 are preferably suitable lengths of pipe, usually steel or alumimum, internally threaded, see 22a, FIG. 3, at one end and externally threaded, see 22b, at the other end. The length of each is such that the externally threaded end will be adjacent to a plane passing through the outer peripheral margin of wheel rim 14a when the internally threaded end is screwed tightly on the free end 19a of a corresponding lug bolt 19, whereby such externally threaded end passes through a receivng hole 23 of the hub cap and projects sufficiently beyond the other face of the hub cap to receive an auxiliary hub cap securement nut, here indicated 24. Tightening of nuts 24 against the hub cap will cinch the peripheral margin 21a of such hub cap firmly against wheel 14, whereupon decorative knob fittings 25 can be snapped into place over lug nuts 24.

It should be noted that the internal diameter of the length of pipe making up an extender 22 will be such that the root diameter of internal threading 22a will be substantially equal to the root diameter of the threads of a lug bolt 19, while the external diameter will be such that the root diameter of external threading 22b will be substantially equal to the root diameter of the threads of a nut 24.

A significant advantage of the hub cap assembly of the invention is that it affords convenient placement for and anchoring of the auxiliary valve stems of the tires of both of the dual wheels of a drive axle set of same. Thus, as are illustrated in FIG. 2, auxiliary valve stems 26 are mounted in respective receiving openings through hub cap 21, which are preferably diametrically opposite each other, by means of nuts 27 fore and aft, while respective lengths of flexible tubing 28 connect such stems 26 with the main valve stems of the respective tires, only main valve stem 29 of tire 16 on outer wheel rim 14 being illustrated. Tubing 28 from the inner tire of the dual set conveniently extends through one of the usual access openings 30 normally provided in a wheel of the type concerned.

Although the embodiment specifically illustrated and described is preferred, it should be realized that the outside diameter of the extenders could be increased and the hub cap openings 23 left equivalent in diameter to the externally threaded ends 22b of the extenders, whereby tightening of the auxiliary nuts 24 would seat the hub cap firmly against shoulders of the extenders between their larger diameters and the lesser diameters of the external threading at such ends 22b thereof.

A highly advantageous embodiment of the invention presently preferred by reason of its solving an annoying problem associated with the previously described embodiments, is illustrated in FIGS. 4–6. Thus, instead of ordinary lug type nuts 24 for hub cap or wheel cover securement, it has been found that paired nuts 31 and 32 of a nylon type plastic placed at opposite faces of the hub cap or wheel cover 21 for each lug bolt extender 22 will tightly lock such hub cap or wheel cover in place secure against inadvertant loosening over a period of time by reason of unavoidable vibration while the vehicle is runninng over even the smoothest of paved roads.

As illustrated, the nuts 31 and 32 are advantageously paired in mating mode at opposite faces of the usual hub cap or wheel cover 21. Here, inside nut 31 is of female configuration having an annular taper 31a leading into the threaded interior of the nut as a female member, and outside nut 32 has a correspondingly tapered male member 32a for fitting into and against female member 31a when such nut 32 is tightened on the extension 22 of a lug bolt 19 to clamp the hub cap or wheel cover 21 in place. The threads of such nuts 31 and 32 hug tightly against the corresponding threads of the lug bolt extenders 22 as also do the mating portions 31a and 32a against the confronting faces of the hub cap or wheel cover 21, the flexibility of the plastic being such as to yield under pressure of nut tightening to clamp the bolt hole margins of the hub cap or wheel cover tightly in place.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A method of installing a hub cap on a recessed, drive axle wheel of a heavy road vehicle having an axle wheel hub, which wheel is secured to the drive axle by a circular series of lug bolts extending through respective lug-bolt-receiving holes in the axle wheel hub, said lug bolts having a series of wheel securement lug nuts securing the wheel to the axle, leaving threaded, free ends of the lug bolts extending beyond the lug nuts adjacent to the bottom of the wheel recess, said method comprising the steps of screwing internally threaded ends of respective extenders onto the said free ends of the lug bolts, said extenders having the sole purpose of holding a hub cap in place to close said wheel recess and having lengths sufficient to place their opposite ends adjacent to a plane through the outer peripheral margins of the wheel rim and having opposite ends externally threaded to receive hub cap securement nuts; placing a wheel hub cap over said wheel recess, said hub cap having a series of extender-receiving holes therethrough which accommodate respective externally threaded ends of the extenders; and applying to and tightening on said externally threaded ends of the extenders respective hub cap securement nuts to hold said hub cap firmly in place.

2. A method according to claim 1, wherein each extender is a rigid pipe having one end internally threaded to receive the externally threaded free end of a lug bolt, and having its opposite end externally threaded to receive a hub cap securement nut.

3. A method according to claim 1, wherein there are dual, drive axle wheels, and pneumatic tires having respective valve stems are mounted on the drive axle wheels, respectively, and the method includes the steps of mounting auxiliary valve stems in the hub cap, passing through receiving openings therein for access externally of the wheels; applying means to secure said auxiliary valve stems as so mounted; and connecting said valve stems of the pneumatic tires with the auxiliary valve stems, respectively, by means of tubing so tire air pressure can be tested and air supplied conveniently to both tires at the outer face of said hub cap.

4. A method according to claim 1, wherein the hub cap extends over the outer peripheral margin of the wheel rim in abutting relationship therewith, and wherein the hub cap securement nuts are tightened to force said hub cap firmly against said peripheral margin of the wheel rim.

5. A method according to claim 1, wherein the hub cap securement nuts are respective pairs of nuts made of a nylon type of plastic and provided with mating female and male annular members which tightly clamp adjacent portions of the hub cap between them.

6. A hub cap and drive wheel assembly on a drive axle of a heavy road vehicle having an axle wheel hub, wherein a recessed drive wheel is secured to the drive axle by means of a circular series of lug bolts extending through respective lug-bolt-receiving holes in the axle wheel hub, said lug bolts having a series of wheel securement lug nuts securing the wheel to the axle and externally threaded, free ends extending beyond said securement lug nuts, respectively, adjacent to the bottom of the wheel recess, said assembly including extenders for said lug bolts for the sole purpose of holding a hub cap in place to close said wheel recess and having one set of ends internally threaded and screwed onto said free ends of the lug bolts, respectively, and having lengths sufficient to place their opposite ends adjacent to a plane through the outer peripheral margin of the wheel rim, said opposite ends of the extenders being externally threaded; a wheel hub cap covering said wheel recess and having a series of extender-receiving holes therethrough which accommodate said externally threaded ends of the extenders; and hub cap securement nuts screwed onto said externally threaded ends of the extenders to hold said hub cap firmly in place.

7. A hub cap and drive wheel assembly according to claim 6, wherein each extender is a rigid pipe having one end internally threaded to receive the externally threaded free end of a lug bolt, and having its opposite end externally threaded to receive a hub cap securement nut.

8. A hub cap and drive wheel assembly according to claim 6, wherein there are dual, drive axle wheels, and pneumatic tires having respective valve stems are mounted on the drive axle wheels, respectively, auxiliary valve stems are mounted in the hub cap, passing through receiving openings therein for access externally of the wheels; means securing said auxiliary valve stems as so mounted; and tubing connecting said valve stems of the pneumatic tires with the auxiliary valve stems, respectively so tire air pressure can be tested and air supplied conveniently at the outer face of said hub cap.

9. A hub cap and drive wheel assembly according to claim 6, wherein the hub cap extends over the outer peripheral margin of the wheel rim in abutting relationship therewith, and wherein the hub cap securement nuts are tightened to force said hub cap firmly against said peripheral margin of the wheel rim.

10. A hub cap assembly for application to a recessed, drive axle wheel of a heavy road vehicle having an axle wheel hub, which wheel is fastened to the drive axle of the vehicle by a circular series of lug bolts extending through respective lug-bolt-receiving holes in the axle wheel hub, said lug bolts having a series of wheel securement lug nuts securing the wheel to the axle and externally threaded, free ends extending beyond said securement lug nuts, respectively, adjacent to the bottom of the wheel recess, comprising a hub cap of size adapted to cover the wheel recess; a plurality of extenders for said lug bolts for the sole purpose of holding the hub cap in place to close said wheel recess and having one set of ends internally recessed for screwing onto the lug bolts of such a drive axle wheel beyond the lug nuts thereof, having the set of opposite ends externally threaded for receiving hub cap securement nuts, and having lengths that place said set of opposite ends adjacent to a plane through the peripheral margin of the rim of such a drive axle wheel when said extenders are screwed onto the lug bolts of such a drive axle wheel; and a corresponding set of hub cap securement nuts for screwing onto the externally threaded ends of said extenders; said hub cap having a circular series of openings therethrough corresponding in position to the said extenders and of diameter which accommodates said extenders when screwed onto said lug bolts of such a drive wheel.

11. A hub cap mounting assembly according to claim 10, wherein the hub cap has receiving holes for auxiliary tire valves, and includes auxiliary tire valves mounted therein and means securing said tire valves in place.

12. A hub cap and drive wheel assembly according to claim 6, wherein the hub cap securement nuts are respective pairs of nuts made of a nylon type of plastic and provided with mating female and male annular members which tightly clamp adjacent portions of the hub cap between them.

13. A hub cap mounting assembly according to claim 10, wherein the hub cap securement nuts are respective pairs of nuts made of a nylon type of plastic and provided with mating female and male annular members which tightly clamp adjacent portions of the hub cap between them.

* * * * *